US009264487B2

(12) United States Patent
Hachet et al.

(10) Patent No.: US 9,264,487 B2
(45) Date of Patent: Feb. 16, 2016

(54) GENERIC ENTITY FOR HIGH-SPEED COMMUNICATION BETWEEN CCM COMPONENTS

(75) Inventors: Olivier Hachet, Palaiseau (FR); Jerome Chauvin, Nice (FR); Gregory Haik, Paris (FR)

(73) Assignee: THALES, Neuilly sur Seine (FR)

( * ) Notice: Subject to any disclaimer, the term of this patent is extended or adjusted under 35 U.S.C. 154(b) by 433 days.

(21) Appl. No.: 13/817,248

(22) PCT Filed: Aug. 17, 2011

(86) PCT No.: PCT/FR2011/051923
§ 371 (c)(1),
(2), (4) Date: Apr. 29, 2013

(87) PCT Pub. No.: WO2012/022916
PCT Pub. Date: Feb. 23, 2012

(65) Prior Publication Data
US 2013/0219016 A1 Aug. 22, 2013

(30) Foreign Application Priority Data
Aug. 17, 2010 (FR) ...................................... 10 03385

(51) Int. Cl.
*G06F 15/16* (2006.01)
*H04L 29/08* (2006.01)
*G06F 9/54* (2006.01)
(52) U.S. Cl.
CPC ................ *H04L 67/10* (2013.01); *G06F 9/544* (2013.01)

(58) Field of Classification Search
CPC .................................. G06F 9/544; H04L 67/10
USPC .................................. 709/217, 220, 223, 227
See application file for complete search history.

(56) References Cited

FOREIGN PATENT DOCUMENTS

| FR | 2938944 A1 | 5/2010 |
|----|------------|--------|
| WO | 2010060926 A1 | 6/2010 |
| WO | WO 2010060926 A1 * | 6/2010 |

OTHER PUBLICATIONS

Anonymous: "DDS for Lightweight CCM Version Beta 1", OMG Specification OMG Document, Feb. 2, 2009, XP002634291, Retrieved from the Internet: URL: http:l/www.omg.orglspec/dds4ccm/1.0/Betal/PDF/.*

(Continued)

*Primary Examiner* — Joseph E Avellino
*Assistant Examiner* — Marshall McLeod
(74) *Attorney, Agent, or Firm* — Troutman Sanders LLP

(57) ABSTRACT

The invention relates to an entity for high-speed communication between transmitter and receiver components of the CORBA Component Model standard, wherein said entity comprises a connector of the DDS4LwCCM standard having a transmitter fragment including an input port connected to an output port of the transmitter component; a receiver fragment having an output port connected to an input port of the receiver component; wherein the transmitter fragment comprises a business logic code comprising a means for transmitting a datum published at the input port of the transmitter fragment to the receiver fragment; and wherein the receiver fragment comprises a business logic code comprising a means for receiving the datum transmitted by the means for transmitting the transmitter fragment in order to publish said datum at the output port of the receiver fragment.

7 Claims, 2 Drawing Sheets

(56) References Cited

OTHER PUBLICATIONS

Anonymous: "DDS for Lightweight CCM Version Beta 1", OMG Specification OMG Document, Feb. 2, 2009, XP002634291, Retrieved from the Internet: URL: http://www.omg.org/spec/dds4ccm/1.0/Beta1/PDF/ (retrieved Apr. 20, 2011).

A. Radermacher et al: "Generating execution infrastructures for component-oriented specifications with a model driven toolchain: a case study for Marte's GCM and real-time annotations", GPCE'09, Oct. 4, 2009 pp. 127-136, XP002634292, Denver, CO, USA, Retrieved from Internet: URL: :http://delivery.acm.org/l0.1145/1630000/1621628/p127-radermacher.pdf?key1=1621628&key2=6436283031&coll=DL&dl=ACM&ip=145.64.134.242&CFID=19723473&CFTOKEN=54293268 (retrieved Apr. 20, 2011).

International Search Report, dated Dec. 22, 2011, which issued during the prosecution of International Patent Application No. PCT/FR2011/051923.

* cited by examiner

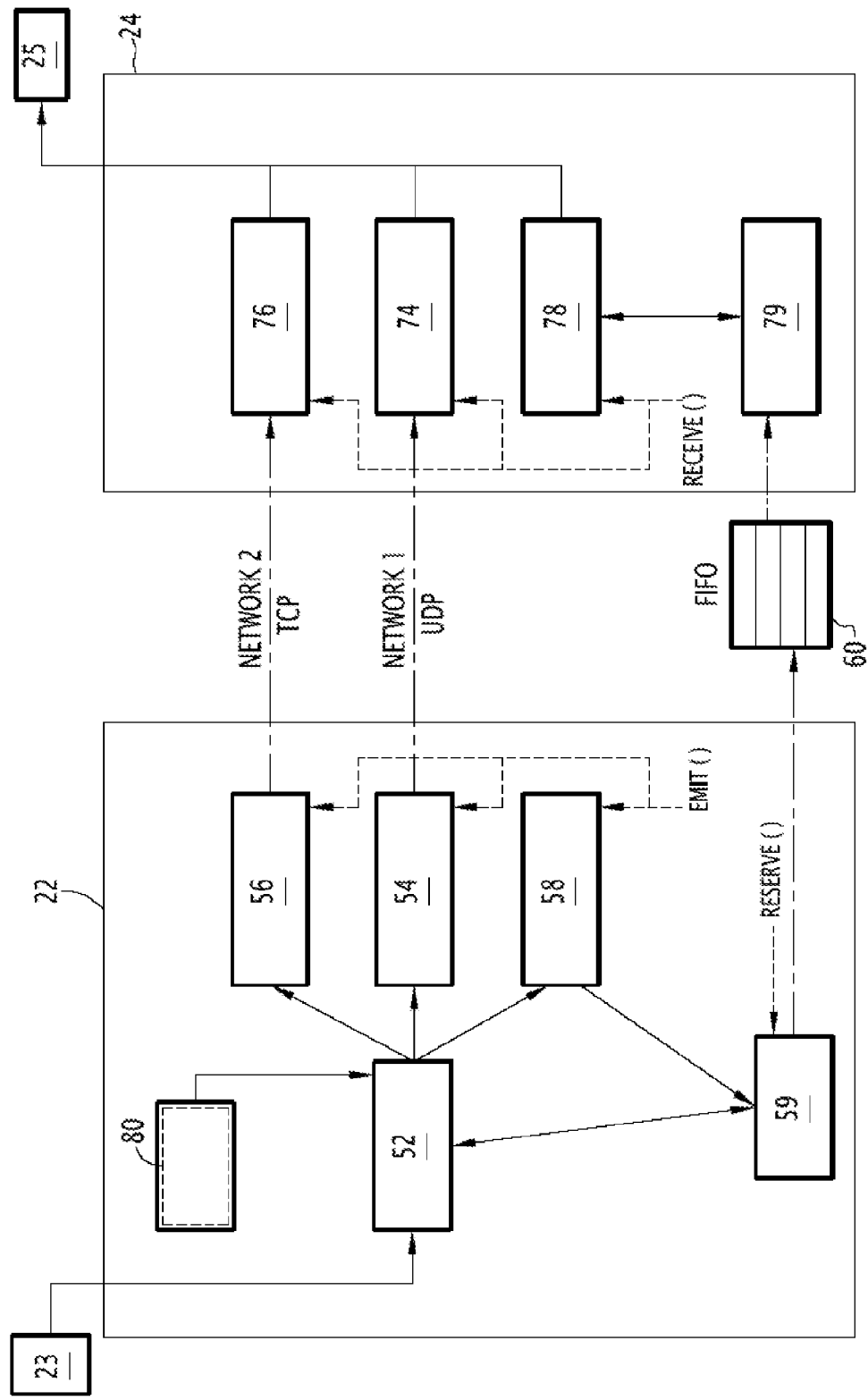

GENERIC ENTITY FOR HIGH-SPEED COMMUNICATION BETWEEN CCM COMPONENTS

CROSS-REFERENCE TO RELATED APPLICATIONS

This application is the National Stage of and claims priority to International Application No. PCT/FR2011/051923 filed Aug. 17, 2011, which published as WO 2012/022916 on Feb. 23, 2012. The International Application claims priority to French Patent Application No. 10 03385, filed Aug. 17, 2010. All of the applications are herein incorporated by reference.

FIELD OF THE INVENTION

The invention relates to the field of the communication between two software components respecting the CCM standard.

BACKGROUND

The CCM (CORBA Component Model) standard, maintained by the OMG (Object Management Group), is a software development approach by assembling elementary entities. This standard thus groups together the notion of software components and that of communication using the CORBA standard between two such components.

A component is a design, implementation, deployment and execution entity, including a wrapper part, making it possible to interface that entity with other entities within the application according to predefined interaction modes, and a business logic code part, encapsulated in the wrapper and making it possible to specify the particular processing performed by that software entity.

CORBA (Common Object Request Broker Architecture) is a communication middleware between components, which allows transparent management of the communication between two components of the application, irrespective of the deployment plan of the application, i.e., how the various entities making up the application are installed on several platforms connected to each other by a network so as to form a computer installation. Thus, when the deployment plan leads to two components needing to exchange data being executed on two different platforms, the CORBA middleware manages all of the aspects of the communication on the network connecting those platforms.

In the case of asynchronous interactions ("events"), this management is done by calling on the CORBA CosNotification notification service. This requires implementing the GIOP protocol (General Inter-ORB Protocol). An ORB (Object Request Broker) is a software entity of the CORBA middleware capable of converting ("serializing") the structure of a datum during processing on the first platform, and a sequence of bytes that can be transmitted over the network to a second platform, on which the datum, after having undergone the inverse conversion by another ORP, will finished being processed.

The CCM standard defines synchronous and asynchronous communication modes between two components.

In the synchronous mode, a first component transmitting an initial datum to a second receiver component suspends the execution of its business logic code as long as the second component has not returned a suitable response message to it. This response message may for example include an acknowledgment datum acknowledging receipt of the initial datum or a datum resulting from processing of the initial datum done by the second component.

In asynchronous mode, a first component transmitting an initial datum to a second receiver component resumes the execution of its business logic code upon transmission of the initial datum, without waiting for a response message from the second receiving code.

The LwCCM (Light weight CORBA Component Model) standard is a subset of the CCM standard that was defined to meet the particular needs of software applications designed to be executed on onboard systems. Such a software application must comply with the major stresses that exist in terms of size in the memory space and consumption of the computation capacities (CPU) of the onboard system.

It must also lead to a low energy consumption.

Furthermore, the software applications intended for onboard systems often serve to perform preprocessing on the acquired data, that preprocessing having to be done in real-time.

Hereafter, "real-time" refers to operation of the application in a characteristic time shorter than a specific time of the system. For example, in the case of the preprocessing of a high-definition video image obtained as output from a camera operating at 24 frames per second, the preprocessing done on each image by the software application must be done in less than 20 ms. Consequently, within the software application, each processing operation done by a component of the application, as well as the communication between two components of that application, must also be done in less than 20 ms.

However, it has been observed that the CORBA Middleware does not make it possible to produce applications operating in real-time, since the exchange of data between two components, based on the CORBA notification service, is relatively low performing and consumes a relatively significant portion of the CPU. As a result, the time necessary to exchange data between components is non-negligible relative to a specific time of the system.

This relative slowness of the communications between two components is accentuated when the quantity or nature of the data to be exchanged between components generates a significant flow. For example, for the preprocessing of a high-definition video image, a data flow of approximately 50 MB must be able to be exchanged between two components.

Thus, while real-time onboard applications need high-speed asynchronous communications, the LwCCM standard does not provide the necessary communication means. Furthermore, it does not make it possible to exchange data of various natures: audio flow, video flow, radio flow, etc.

SUMMARY

The invention therefore aims to offset the aforementioned problem by making it possible, while remaining in the LwCCM standard, to offer developers of real-time onboard applications the possibility of high-speed communication between components.

To that end, the invention relates to a generic entity for high-speed communication between a transmitter component and at least one receiver component.

The invention also relates to an information recording medium including the instructions for instancing on a computer installation of an entity of the type previously presented, when those instructions are executed by the computation unit of a computer.

The invention further relates to a computer installation including at least one platform and at least one instancing of an entity of the type previously described for the high-speed communication between instancing, on a first platform, of a transmitter component and at least one instancing, on the second platform, of a receiver component, such components respecting the CORBA Component Model standard, version 1.0 and the first and second platforms either being combined, or remote and connected to each other by a network.

The invention also relates to a high-speed communication method between a transmitter component and at least one receiver component, these components respecting the CORBA component model standard, version 1.0, including the following steps of instancing an entity of the type previously presented; acquiring, by the entity, of a datum published by the transmitter component on the input port of the transmitter fragment of the entity; communicating the acquired datum between the transmitter and receiver fragments of the entity; and publishing the datum on the input port of the receiver component via the output port of the receiver fragment.

BRIEF DESCRIPTION OF THE DRAWINGS

The invention and the advantages thereof can be better understood upon reading the following description, provided solely as an example, and done in reference to the appended drawings, in which:

FIG. 2 is a diagrammatic block diagram of the business logic code of the connector FIG. 1.

DETAILED DESCRIPTION

Figure 1:
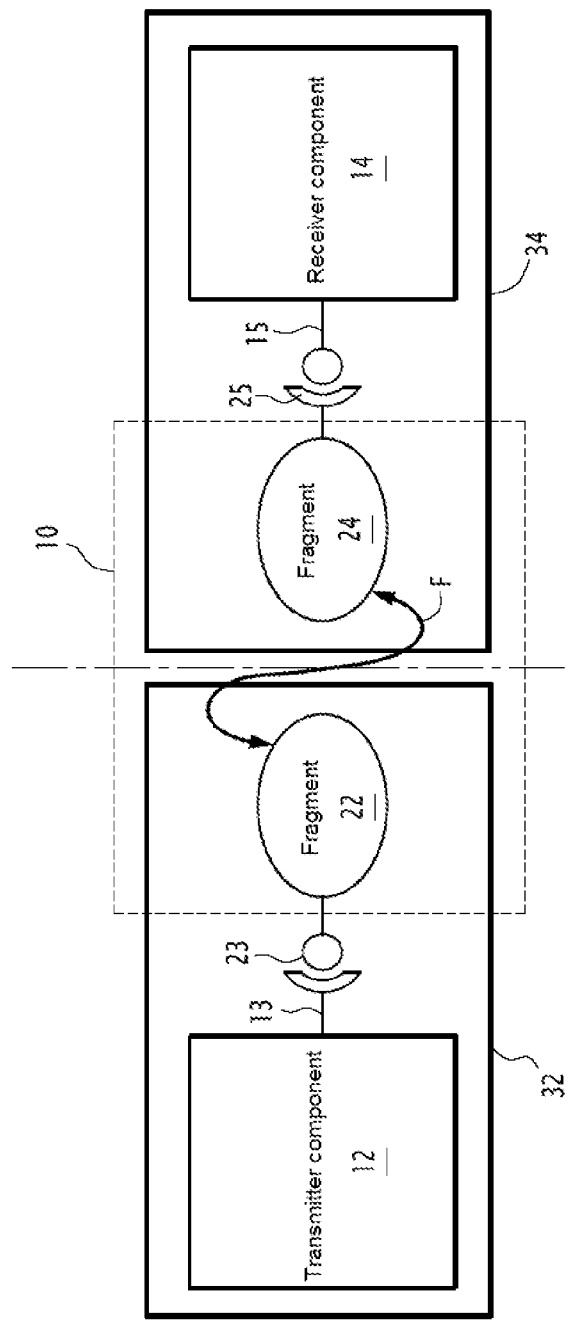
FIG. 1 is an illustration within the meaning of the CCM standard of the connector according to the invention for the direct communication between two components.

The present description is based on the most recent versions of the standards as of the filing date of this patent application, i.e., CORBA Component Model V4.0, or more particularly the document "Formal/06-04-01," as well as the following two standards making it possible to extend the CCM standard: DDS4LwCCM, V1.0 beta1, more particularly the document "PTC/2009-02-02." These documents are freely accessible on the OMG site at the address www.omg.org.

The invention can include the connector, within the meaning of the DDS4LwCCM standard, serving as an interface between an output port of a transmitter component and an input port of a receiver component.

The wrapper part of the connector is shown diagrammatically in FIG. 1, while the business logic code part of the connector is shown in FIG. 2.

In reference to FIG. 1, the connector 10 ensures the communication of data transmitted by a transmitter component 12 to a receiver component 14.

The transmitter component includes an output port 13.

Similarly, the receiver component includes an input port 15.

The connector is fragmented. It includes a first transmitter fragment and a second receiver fragment.

The transmitter fragment includes an input port 23 designed to be connected to the output port 13 of the transmitter component. Similarly, the receiver fragment includes an output port 25 designed to be connected to the input port 15 of the receiver component.

The transmitter fragment 22 constitutes a service, within the meaning of the DDS4LwCCM standard, of the output port 13 of the transmitter component. During deployment of the application, the transmitter fragment and the transmitter component are instanced together on a same platform. This is shown diagrammatically in FIG. 1 by a rectangle 32 encompassing the transmitter component and the transmitter fragment in a same software entity.

Similarly, the receiver fragment constitutes a service, within the meaning of the DDS4LwCCM standard, associated with the input port of the receiver component.

It should be noted that between the port of a component and the corresponding port of the fragment, the exchange of data can be done directly by using an asynchronous method, the connector managing the mechanism capable of making the connection asynchronous. The CORBA middleware is not used.

The transmitter and receiver fragments communicate with each other directly (arrow F in FIG. 1). This communication is completely transparent from the perspective of the transmitter and receiver components.

The business logic code part of the connector making it possible to perform the direct communication F path can now be described in reference to FIG. 2.

The transmitter fragment 22 includes transmitting means including an acquisition means 52, capable of collecting a datum published on the input port 23 of the transmitter fragment, and transmitting it to one of the communication means; a UDP communication means 54, capable of receiving a datum from the acquisition means 52 and transmitting it on the network NETWORK1, according to the UDP protocol; a TCP communication means 56, capable of receiving a datum from the acquisition means 52 and transmitting it on a network NETWORK2, according to the TCP protocol; a local mode communication means 58, capable of receiving a datum from the acquisition means 52 and publishing it by calling on writing means 59; and a writing means 59, capable of preserving, upon request of the acquisition means 52, a memory space shared in the buffer 60 of a memory of the platform on which the transmitter fragment is deployed, and writing a datum therein that is transmitted to it by the local mode communication means 58.

The receiver fragment includes a conjugated UDP communication means 74, capable of receiving a UDP datum received on a predetermined channel, and publishing it on the output port 25 of the receiver fragment; a conjugated TCP communication means 76, capable of receiving a TCP datum received on a predetermined channel, and publishing it on the output port 25 of the receiver fragment; a conjugated local mode communication means 78, capable of publishing a datum transmitted to it by read means 79 on the output port 25 of the receiver fragment; and a read means 79, capable of reading a datum placed in a shared memory space of the buffer 60, and transmitting that datum to the local mode communication means 78.

The connector 10 according to and example of the invention extends the CCM standard by offering generic semantics for the high-speed exchange of data between the transmitter and receiver components. The connector is configured during the deployment of the application. It is configured as a function of the deployment plan, but also using a configuration file such as the file 80 in the ".xml" format.

When the application is started, the transmitter and receiver fragments automatically detect whether they are instanced on a same platform of the computer installation or on two different platforms. In the affirmative, the local communication mode is selected. Otherwise, the remote communication mode is selected.

This automatic detection can be done as follows in one implementation of the 1 to 1 entity. Each fragment recovers the IP address, machine name and/or equivalent information for the platform on which it is installed. Then, the two platforms exchange their respective information to determine whether that information is identical or different, i.e., whether the two fragments are installed on the same platform or on two different platforms.

The configuration file 80 for example includes a service quality parameter for selecting the remote mode communication protocol: either the TCP mode if the developer wishes for reliable communication, or the UDP mode if the speed of the communication is more important. In fact, the TCP protocol implements methods for verifying the integrity of the data transmission, which increases the quality of the communication, but slows the speed thereof.

The buffer 60 can be of the FIFO (First In First Out) type. In the present example, the buffer 60 is shared by the transmitter fragment and the receiver fragment. The buffer 60 to that end must be situated in a shared memory of the platform on which the receiver and transmitter fragments are deployed. This can make it possible to avoid copying the content of a write buffer associated with the transmitter fragment into a read buffer associated with the receiver fragment. In this way, copying errors are avoided and, in the case of a 1 to N connector, including 1 transmitter fragment and N receiver fragments, this prevents N copies of the write buffer.

The local mode communication can be done as follows, in one example.

The transmitter fragment 22 and the receiver fragment 24 are instanced, using the information contained in the deployment plan and the configuration file 80, and, in particular, the selection of the communication protocol (mode and service quality).

The acquisition means 52 acquire a new datum published on the input port 23 of the transmitter fragment. They call on the write means 59 so that the latter reserve memory space in the data exchange buffer 60.

Once a memory space is reserved, the write means 59 send an acknowledgment message back to the acquisition means 52.

At that point, the acquisition means 52 transmit the datum to the local mode communication means 58.

Upon receipt of the datum, the local mode communication means 58 transmit it to the write means 58.

Upon receipt of that datum, the write means launch the execution of a method for writing the data in the memory space previously reserved.

On the receiver fragment 24 side, the write means 79 successively travel through the various memory spaces of the buffer 60. They access a memory space and read the datum contained therein.

The read means 79 transmit to the read data using the conjugated local mode communication means 78 of the receiver fragment.

As of receipt of the datum, the conjugated local mode communication means 78 publish it on the output port 25 of the receiver fragment.

When the receiver fragment and receiver fragment(s) are instanced on different platforms, connected to each other by a network, the remote mode communication can be done as follows:

The transmitter fragment 22 and the receiver fragment 24 are instanced, using the information contained in the configuration file 80, and, in particular the selection of the protocol, for example TCP, to exchange data on the network NETWORK2.

The acquisition means 52 acquire a new datum published on the input port 23 of the transmitter fragment. The acquisition means 52 transmit the datum to the TCP communication means 56.

As of receipt of the datum, the TCP communication means 56 serialize the datum and transmit it over the network.

On the receiver fragment 24 side, the conjugated TCP communication means 76 search for a predetermined channel and upon receipt of a datum, they perform the reverse conversion of the serialization. The conjugated TCP communication means 76 publish the datum thus obtained on the output port 25 of the receiver fragment.

Although the example described above allows 1 to 1 communication between the transmitter fragment and a receiver fragment, alternatively, the connector includes 1 transmitter fragment and N receiver fragments for a 1 to N communication.

By implementing an example of the present generic connector, the applicant has managed, in a video image processing application, to perform video data exchanges between connectors at a rate of 160 MB per second in local mode, 50 MB per second in UDP mode, and 30 MB per second in TCP mode, while consuming approximately 10% of the CPU.

The examples of the present solution make it possible to optimize the use of hardware resources by managing the data flow directly within the business logic code of the connector.

This makes it possible to avoid using a CORBA notification service, which requires implementation of the GIOP protocol. On the contrary, according to the invention, the data are serialized only when it proves necessary, i.e., in remote mode.

Furthermore, the CORBA notification service prohibits data sharing between the transmitter component and receiver component via a shared memory. It does not offer the possibility of choosing the quality of service.

Moreover, encoding high-speed communication means in a connector rather than a component makes it possible to introduce a configurable generic entity into the LwCCM standard having an interface respecting the IDL3 ("Interface Description Language" Version 3) standard.

In the annex, a copy of the specification code for the interface of the software connector according to the invention is reproduced.

Thus, the application code remains legible and its complexity does not increase. It is easy to test and maintain.

---

ANNEX
Implementation of a communication connector named "Fast Events":

Interface of the connector "Fast Events":
// FastEventsSource
local interface FastEventsSourceIntf<typename T>
{
　　FastEvents$T$Writer reserve( );
　　void push(in FastEvents$T$Writer writer);
　　void delete(in FastEvents$T$Writer writer);
};
port_type FastEventsSourcePort<typename T>
{
　　uses FastEventsSourceIntf<T> none;
};
// FastEventsSink
local interface FastEventsSinkIntf<typename T>
{
　　void push(in FastEvents$T$Reader reader);
};

ANNEX
Implementation of a communication connector named "Fast Events":

```
port_type FastEventsSinkPort<typename T>
{
   provides FastEventsSinkIntf<T> none;
};
Usage example:
//Définition du type échangé
eventtype Ev_Track
{
   public long id;
   public long date;
};
Transmitter component:
component subject
{
   port FastEventsSourcePort<Ev_Track> tracks_out;
};
Receiver component:
component sink
{
   port FastEventsSinkPort<Ev_Track> tracks_in;
};
FastEvent Connector:
connector FastEventCnx
{
   mirrorport FastEventsSourcePort<Ev_Track> data_in;
   mirrorport FastEventsSinkPort<Ev_Track> data_out;
};
Code generated for the "Fast Events" marshaller:
module FastEvents
{
   local interface Ev_TrackWriter
   {
      void id (in long value);
      void date (in long value);
   };
};
Code generated for the "Fast Events" demarshaller:
module FastEvents
{
   local interface Ev_TrackReader
   {
      long id ( );
      long date ( );
   };
};
Code generated for the transmitter component:
local interface Ev_Track_FastEventsSourceIntf
{
      ::FastEvents::Ev_TrackWriter reserve ( );
      void push (in ::FastEvents::Ev_TrackWriter writer);
      void delete (in ::FastEvents::Ev_TrackWriter writer);
};
component subject
{
   uses ::Ev_Track_FastEventsSourceIntf tracks_out_src;
};
Code generated for the receiver component:
local interface Ev_Track_FastEventsSinkIntf
{
      void push (in ::FastEvents::Ev_TrackReader reader);
};
component sink
{
   provides ::Ev_Track_FastEventsSinkIntf tracks_in_snk;
};
Code of the transmitter component:
//appel sur le contexte du composant pour avoir le réceptacle
CCM_subject_Context_ptr source =
context->get_connection_tracks_out_src( );
//récupération d'une instance de marshaller
FastEvents::ISP::Ev_TrackWriter_ptr track_ref = source->reserve( );
// Remplissage des valeurs
track_ref->id(track_infos_.id);
track_ref->date(track_infos_.date);
//Envoi de l'événement
source->push(track_ref);
//Libération du marshaller
context->delete_Ev_TrackWriter(track_ref);
Code of the receiver component:
//Implementation de la reception
void
CCM_sink_impl::push(FastEvents::Ev_TrackReader_ptr trackReader)
{
   long id = trackReader->id( );
   long date = trackReader->date( );
}
```

The invention claimed is:

1. A generic entity for high-speed communication between a transmitter component and at least one receiver component, said components respecting the CORBA Component Model standard, version 1.0, and includes a connector within the meaning of the DDS4LwCCM standard, version 1.0 Beta1, comprising:
a transmitter fragment comprising a wrapper part including an input port designed to be connected to an output port of the transmitter component; and
at least one receiver fragment comprising a wrapper part including an output port designed to be connected to an input port of said at least one receiver component;
wherein said transmitter fragment comprises a business logic code part including a transmitter transmitting a datum published on the input port of the wrapper part of said transmitter fragment, to said at least one receiver fragment;
wherein said receiver fragment comprises a business logic code part including a receiver receiving the datum transmitted by the transmitter of the transmitter fragment, for publication of said datum on the output port of the wrapper part of said receiver fragment
wherein the transmitter of the transmitter fragment includes a local mode communicator, and in that the receiver of the receiver fragment include conjugated local mode communicator;
wherein the transmitter of the transmitter fragment includes at least one remote mode communicator, and in that the receiver of the receiver fragment include at least one conjugated remote mode communicator;
wherein the transmitter includes an acquisition device capable of acquiring a datum published on the input port of the transmitter fragment and transmitting it either to the local mode communicator or to the remote mode communicator;
wherein each remote mode communicator can perform a serialization conversion of the datum to be transmitted, and wherein each conjugated remote mode communicator can perform an inverse conversion on the received data; and
wherein the transmitter includes a writer writing in a transmitter buffer, capable of reserving a memory space of the write buffer and writing a datum applied as input of the writer by the local mode communicator, and the receiver includes a reader in the receiver buffer capable of reading a datum in the receiver buffer and applying it as input for the conjugated local mode communicator.

2. The entity according to claim 1, wherein the input port of said transmitter fragment and the output port of said at least one receiver fragment are of the synchronous type.

3. The entity according to claim 1, wherein the transmitter includes a TCP communicator and a UDP communicator, and in that the receiver includes a conjugated TCP communicator and conjugated UDP communicator, the entity also including a configuration file including a selection parameter of the communication protocol to be used in remote mode.

4. The entity according to claim 1, wherein the writer and the reader are capable of using a shared buffer situated in the shared memory.

5. A non-transient information recording medium, comprising programming providing instructions to instance an entity according to claim 1 on a computer installation, when those instructions are executed by the computation unit of a computer.

6. A computer installation including at least one platform, comprising at least one instancing of an entity according to claim 1 for high-speed communication between an instancing on a first platform of the transmitter component and at least one instancing on a second platform of the receiver component, said components respecting the CORBA Component Model standard, version 1.0 and said first and second platforms being able to be either combined, or remote and connected to each other by a network.

7. A high-speed communication method between a transmitter component and at least one receiver component, said components respecting the CORBA Component Model standard, version 1.0, wherein the method comprises the following steps:

instancing an entity according to claim 1;

detecting automatically whether the transmitter and receiver fragments are instanced on a same platform of a computer installation, the local communicator being then selected, or on two different platforms, the at least one remote communicator being then selected;

acquiring, by the entity, of a datum published by the transmitter component on the input port of the transmitter fragment of the entity;

communicating the acquired datum between the transmitter and receiver fragments of the entity; and publishing the datum on the input port of the receiver component via the output port of the receiver fragment.

* * * * *